(12) United States Patent
Inoue et al.

(10) Patent No.: US 7,282,907 B2
(45) Date of Patent: Oct. 16, 2007

(54) ANTIFRICTION BEARING UNIT HAVING A SENSOR AND A RESOLVER

(75) Inventors: Masahiro Inoue, Nara (JP); Katsura Koyagi, Kashiwara (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 10/539,804

(22) PCT Filed: Dec. 19, 2003

(86) PCT No.: PCT/JP03/16390

§ 371 (c)(1),
(2), (4) Date: Jun. 20, 2005

(87) PCT Pub. No.: WO2004/057276

PCT Pub. Date: Jul. 8, 2004

(65) Prior Publication Data

US 2006/0087315 A1  Apr. 27, 2006

(30) Foreign Application Priority Data

Dec. 20, 2002 (JP) .............................. 2002-369457
Jan. 31, 2003 (JP) .............................. 2003-024239

(51) Int. Cl.
*G01B 7/30* (2006.01)
*G01P 3/44* (2006.01)

(52) U.S. Cl. ............ 324/173; 324/207.25; 324/207.18; 384/448

(58) Field of Classification Search ........... 324/207.25, 324/173–174, 207.18; 384/448
See application file for complete search history.

(56) References Cited

U.S. PATENT DOCUMENTS

| 3,079,548 | A | * | 2/1963 | Robinson ..................... 323/216 |
| 3,719,841 | A | * | 3/1973 | Ritsema ....................... 310/155 |
| 4,752,732 | A | * | 6/1988 | Van Schoiack et al. . 324/207.18 |
| 4,907,445 | A | * | 3/1990 | Okumura .................... 73/118.1 |
| 4,932,245 | A | * | 6/1990 | Shelton ....................... 73/118.1 |
| 5,003,259 | A | * | 3/1991 | Palazzetti et al. ........ 324/207.14 |
| 5,059,900 | A | * | 10/1991 | Phillips ........................ 324/160 |
| 5,140,262 | A | * | 8/1992 | Stolfus ..................... 324/207.2 |
| 5,382,900 | A | * | 1/1995 | Hayashi .................. 324/207.23 |
| 5,624,192 | A | * | 4/1997 | Rigaux et al. .............. 384/448 |
| 5,663,640 | A | * | 9/1997 | Sakamoto .................... 324/173 |
| 5,696,444 | A | * | 12/1997 | Kipp et al. ............. 324/207.23 |
| 5,914,548 | A | * | 6/1999 | Watanabe et al. ............. 310/88 |
| 6,186,667 | B1 | * | 2/2001 | Nakamura et al. .......... 384/448 |
| 7,157,906 | B2 | * | 1/2007 | Miya ..................... 324/207.25 |
| 2004/0174162 | A1 | * | 9/2004 | Kuwahara .............. 324/207.25 |

(Continued)

FOREIGN PATENT DOCUMENTS

JP    60-42603    3/1985

(Continued)

*Primary Examiner*—Jay M Patidar
(74) *Attorney, Agent, or Firm*—Oblon, Spivak, McClelland, Maier & Neustadt, P.C.

(57) ABSTRACT

An outer ring is provided with the stator of a resolver, and a ring member with the rotor of the resolver. The stator comprises an annular core and a winding provided around the core. The ring member is provided at a position opposed to the stator with an eccentric cylindrical face serving as the rotor and eccentric with respect to other outer peripheral surface of the ring member.

12 Claims, 10 Drawing Sheets

U.S. PATENT DOCUMENTS

2005/0121987 A1* 6/2005 Ritzinger et al. ......... 310/68 B

FOREIGN PATENT DOCUMENTS

| JP | 8-136560 | 5/1996 |
|---|---|---|
| JP | 8-248049 | 9/1996 |
| JP | 11-257998 | 9/1999 |
| JP | 2000-225931 | 8/2000 |
| JP | 2000-258187 | 9/2000 |
| JP | 2001-201362 | 7/2001 |
| JP | 2002-107111 | 4/2002 |

* cited by examiner

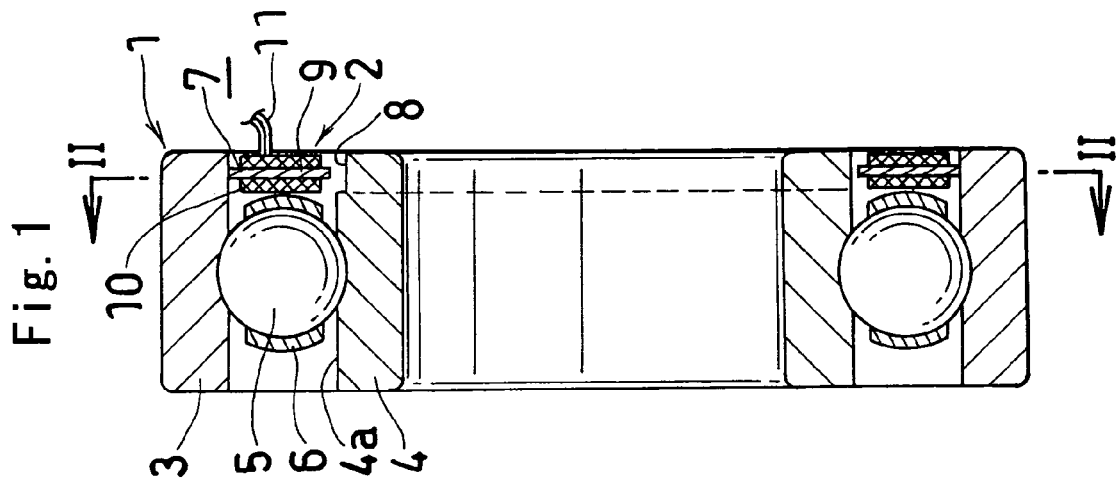
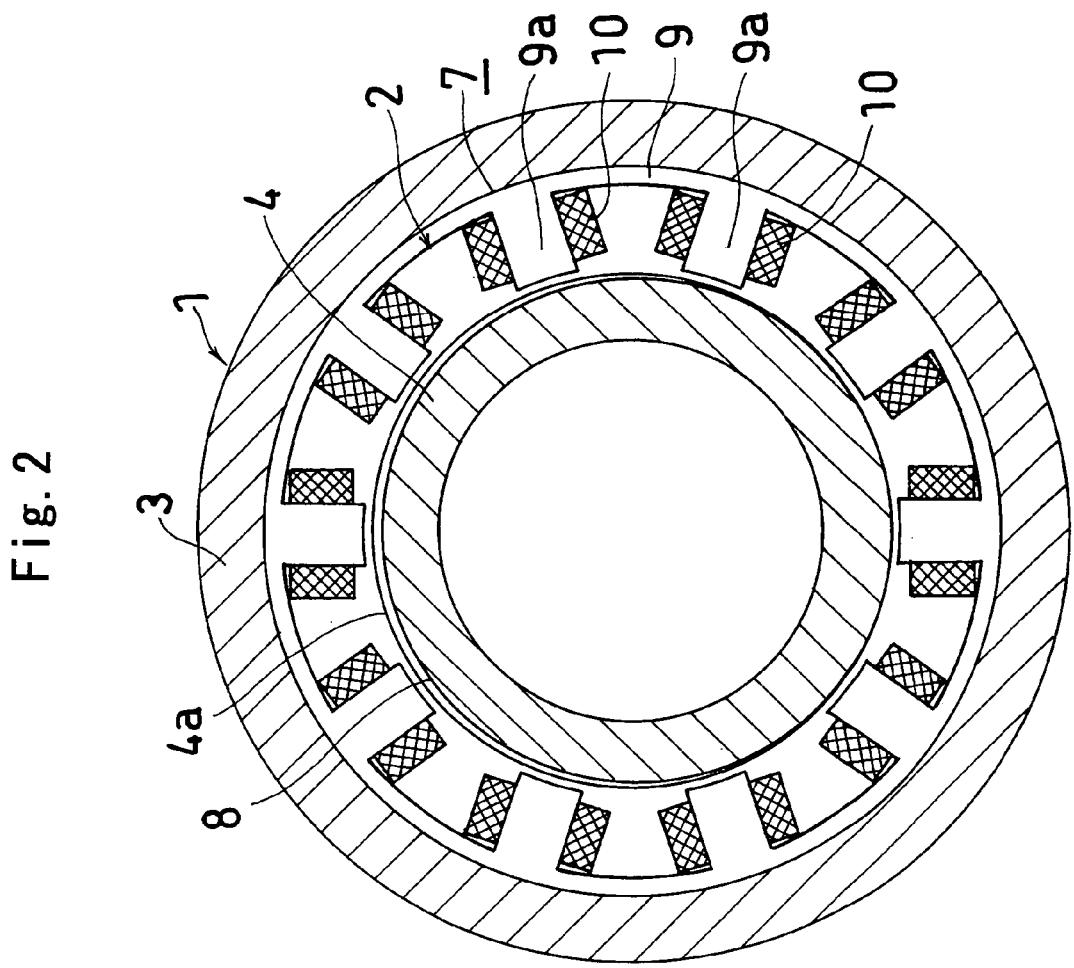

ANTIFRICTION BEARING UNIT HAVING A SENSOR AND A RESOLVER

BACKGROUND ART

Field of the Invention

The present invention relates to antifriction bearing units having a sensor for use in motor vehicle ABS or the like.

DISCUSSION OF THE BACKGROUND

Antifriction bearing units are already known which comprise an antifriction bearing, and a sensor device and a pulser ring serving as the portion to be detected, the sensor device and the pulser ring being mounted on the bearing. Such units are used in railroad cars and motor vehicles for supporting an axle or a rotating shaft for transmitting rotation to the axle and for detecting rotation, i.e., the speed of rotation of the axle or the angle of rotation.

It is essential that sensor-equipped antifriction bearing units of the type mentioned be improved in resolution in detecting rotation and reduced in diameter. In the case where the pulser ring is used, the resolution is dependent on the number of poles of the pulser ring which are provided by magnetization, so that improvement in resolution requires an increase in the number of poles. However, this results in a lower magnetic flux density, diminishing the absolute value of signal output of the sensor device and entailing the problem that rotation can no longer be measured accurately. Thus, the improvement in resolution is limited.

Accordingly, JP-U No. 6-47867 discloses a sensor-equipped antifriction bearing unit wherein the portion to be detected is used in place of the pulser ring. The disclosed unit has a generally U-shaped member to be detected and having a plurality of projections, and a detecting portion positioned between the projections so as to obtain an improved output for detecting the speed of rotation. Further JP-A No. 11-174069 discloses a portion to be detected which is fitted around a nut for fixing a bearing device so as to provide a structure shaped with improved accuracy and to improve the accuracy of detection.

The bearing unit disclosed in the first publication has the problem that the member to be detected is cumbersome to make. The bearing unit of the second publication has the problem that the unit is not usable for bearing devices having no nut.

It appears possible to obtain an antifriction bearing unit equipped with a sensor adapted to detect the state of rotation, utilizing a VR-type resolver having high resolution and comprising a stator and a rotor. However, conventional VR-type resolvers have a special shape and made by superposing components which are prepared by drawing. When to be used as it is, therefore, the conventional resolver has the problem of making the bearing unit costly.

An object of the present invention is to provide an antifriction bearing unit having a sensor of high resolution and low cost, utilizing a resolver of reduced cost and high resolution.

DISCLOSURE OF THE INVENTION

The present invention provides a sensor-equipped antifriction bearing unit comprising an antifriction bearing having an outer ring member and an inner ring member, and a resolver for detecting the rotation of a shaft, one of the outer ring member and the inner ring member being provided with a stator of the resolver, the other ring member being provided at a position opposed to the stator with a face to be detected and formed by machining for use as a rotor of the resolver.

The term "machining" as used herein does not mean joining of a member to be made into a rotor to the outer ring member or inner ring member as by a press fit, but instead means to form the face of the rotor to be detected on an inner peripheral portion of the outer ring member which has a raceway on the inner periphery thereof, or on an outer peripheral portion of the inner ring member which has a raceway on the outer periphery thereof, for example, by cutting.

With the bearing unit of the present invention, one of the outer ring member and the inner ring member is provided with a stator of the resolver, and other ring member is provided at a position opposed to the stator with a face to be detected and formed by machining for use as a rotor of the resolver. Accordingly, there is no need to use another member anew for the rotor, and the resolver can be incorporated into the antifriction bearing compactly. The sensor-equipped antifriction bearing unit provided is therefore lower in cost and improved in resolution.

The principle of detecting the angle of rotation by the resolver is known. When an outer ring member and an inner ring member rotate relative to each other with sinusoidal voltage applied to the stator, an air gap between the stator and the face of the rotor to be detected varies continuously or discretely for the stator to produce a voltage in accordance with the angle of rotation, whereby the state of rotation of the antifriction bearing unit can be detected. The stator and the rotor are made from a magnetic material. The outer ring or inner ring member to be machined for forming a face for use as the rotor is made, for example, from SUJ2. This ensures both the strength of the member as a bearing raceway member and the magnetic characteristics of the rotor.

With the sensor-equipped antifriction bearing unit of the present invention, the outer ring is fixed, for example, to a housing, and a rotating shaft or the like is fixed to a ring member, and the unit is used for supporting the rotating shaft and for detecting the state of rotation of the shaft.

Various resolvers are usable which include brushless resolvers of various types and brushless synchronous type, among which suitable are VR-type (variable-reactance type) resolvers.

The stator of the resolver comprises, for example, an annular core having a saw-toothed inner periphery, and a stator winding formed by providing coils respectively on all teeth of the core. The stator is fixed to a shoulder portion of the outer ring member by a press fit, with the inner ends of the core teeth facing radially inward.

The rotor of the resolver is provided, for example, by machining the portion of the inner ring member opposed to the stator for use as a rotor. The face thus formed and to be detected is in the form of an eccentric cylindrical face, namely, a cylindrical face which is eccentric with respect to the other outer peripheral surface (cylindrical surface concentric with the inner periphery of the outer ring member) of the inner ring member. The eccentric cylindrical face can be formed easily and accurately by machining the inner ring member with a cutting tool, with its axis positioned out of alignment with the axis of the inner ring member.

The rotor face to be detected can be shaped variously insofar as it is in the form of a cylindrical face which is eccentric with respect to a perfect cylindrical face. The rotor face to be detected can be in the form of a cylindrical face centered about the axis of the antifriction bearing and having a cutout. The cutout can be one in number, or a plurality of cutouts may be formed. These cutouts need not be arranged equidistantly in the circumferential direction. The cylindrical face having such a cutout can be made easily and accurately, for example, by making an outer ring member or inner ring member in the same manner as conventionally, and thereafter forming an axially extending cutout in the inner periphery or outer periphery of the member in the same manner as when forming a key groove. The cutout need not be limited to a groovelike form but may be, for example, in the form of a flat portion formed in the circumference.

In the case where the antifriction bearing is a single-row bearing, it is desirable to dispose the stator at one end of the bearing. When the bearing is a double-row bearing, it is of course acceptable to provide the stator at one end of the bearing, while when desired, the stator may be disposed at an intermediate portion between the two rows of rolling bodies.

For example when rotation is to be detected for ABS using the sensor-equipped antifriction bearing unit, the rotation is detectable with sufficient accuracy as required even if the rotor is in the form of a simple eccentric cylindrical face or a cylindrical face having a cutout. The use of the rotor of simple eccentric cylindrical face or a cylindrical face having a cutout results in a reduced cost. Furthermore, there is no need to attach another rotor member to the rotatable ring, while the provision of the stator on the stationary ring realizes the rotation detecting function described, consequently serving to provide a compacted bearing unit.

With the sensor-equipped antifriction bearing unit of the invention, the inner ring member is a rotation-side raceway member having a flange for attaching a wheel thereto and to be provided with the wheel, and the outer ring member is a stationary-side raceway member having a portion to be attached to a vehicle body side and-mountable on a vehicle body. The bearing unit thus constructed is incorporated as a hub unit into vehicles.

When to be used as a hub unit, the bearing unit has the following construction.

The rotation-side raceway member comprises a shaft composed of a large-diameter portion having a first raceway and a small-diameter portion having an outside diameter smaller than the diameter of the first raceway, and a ring having a second raceway and fitted around the small-diameter portion of the shaft.

In this case, it is desirable that the stator be disposed at an end portion of the stationary-side raceway member opposed to a shoulder portion of the ring of the rotation-side raceway member, and that the face of the rotor to be detected be formed on an outer periphery of the shoulder portion of the ring.

This construction makes it possible to take out a lead wire or connector for the stator from an end portion of the unit without the need to pass such a member through a hole in the stationary-side raceway member by hand unlike the case wherein the stator is disposed between two rows of rolling bodies of the hub unit. The unit can be assembled automatically in the same manner as in the prior art by performing only the additional step of forcing the stator into a hub unit by a press fit which unit has no sensor device. This makes the sensor-equipped hub unit less costly and compacted.

The wiring for the stator is led to the outside through an opening in the end portion of the stationary-side raceway member in the form of a hollow cylinder, and a hollow cylindrical cover having a bottom is provided over the end portion opening of the stationary-side raceway member, the cover having at the bottom thereof a connector member to be provided with a signal transmission harness. The stator is fixed to the cover, and the cover is fixed to the stationary-side raceway member. Alternatively, the stator may be fixed directly to the stationary-side raceway member by a press fit without using an intervening cover. A wiring member including a lead wire and a connector pin is fixedly embedded in a resin filling the interior thereof. In this manner, the wiring for the stator can be led outside easily and be free of the likelihood of breaking.

The rotor face to be detected which is in the form of an eccentric cylindrical face can be provided easily with high accuracy, for example, by using a cutting tool with its axis out of alignment with the axis of the center axis of the inner peripheral surface of the ring when machining the outer periphery of the ring.

The sensor device is provided with a processing circuit for processing the signal to be output in accordance with the air gap between the stator and the face of the rotor to be detected, i.e., the outer peripheral face of shoulder portion of the ring. Preferably, the processing circuit has a rotation sensor for determining the angle of rotation or rotational speed required, for example, for ABS, and a wheel ground contact load calculator for calculating the ground contact load on the wheel from the air gap between the stator and the rotor.

With speed variations of the vehicle or alterations in the posture thereof, the ground contact load on each tire varies, and the displacement of the axis relative to the vehicle body varies with the magnitude of the ground contact load. The displacement of the axle is in corresponding relation with the displacement of the rotation-side raceway member relative to the stationary-side raceway member in the hub unit, i.e., to the air gap between the stator and the rotor. Accordingly, by determining the relationship between the ground contact load on the tire and the displacement of the rotation-side raceway member in advance, and measuring the air gap between the stator and the rotor by the resolver, the ground contact load can be calculated from the ground contact load-displacement relational expression and from the air gap with high accuracy. The ground contact load on the tire thus obtained is used as substitute data for the slip ratio in ABS control and also for drive force control or brake force control, thus contributing to improvements in vehicle control. Since the resolver itself detects rotation, rotation data is also available from the resolver along with the ground contact load, such that the important parameters of wheel rotation and tire ground contact load can be obtained by a single sensor.

BRIEF DESCRIPTION OF THE DRAWINGS

FIG. 1 is a view in cross section showing a first embodiment of sensor-equipped antifriction bearing unit according to the invention.

FIG. 2 is a view in section taken along the line II-II in FIG. 1.

BEST MODE OF CARRYING OUT THE INVENTION

Figure 3:
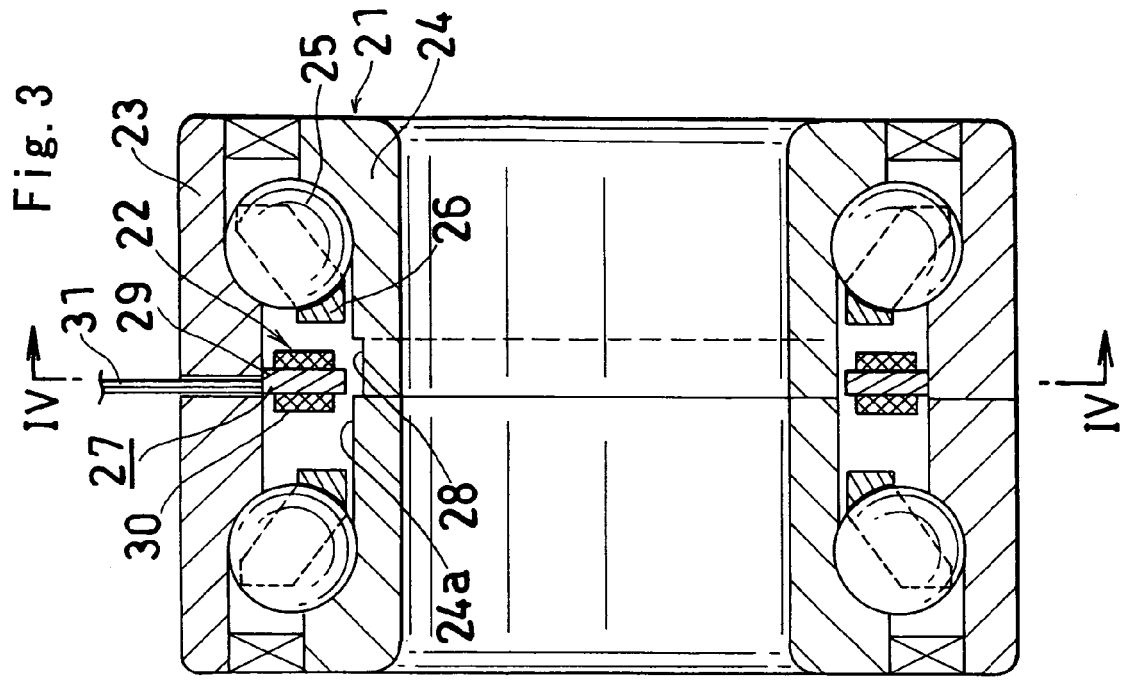
FIG. 3 is a view in cross section showing a second embodiment of sensor-equipped antifriction bearing unit according to the invention.

Embodiments of the invention will be described below with reference to the drawings.

FIGS. 1 and 2 show a first embodiment of sensor-equipped antifriction bearing unit of the invention. In the following description, the terms "left," "right," "upper" and "lower" refer respectively to the left- and right-hand sides and upper and lower sides of FIG. 1.

As shown in FIGS. 1 and 2, the bearing unit comprises an antifriction bearing 1 serving as a bearing, and a resolver 2 for detecting the rotation thereof.

The antifriction bearing 1 comprises an outer ring 3 serving as a stationary ring, a ring member 4 serving as a rotatable ring, balls 5 serving as rolling bodies arranged between the ring 3 and the ring member 4, and a retainer 6. Although not shown, the outer ring 3 is fixed to a housing or the like, and the ring member 4 has a rotating shaft or the like fixed thereto.

The resolver 2 is a VR-type brushless resolver, and comprises a stator 7 and a rotator 8. The stator 7 is provided on the outer ring 3, and the rotor 8 on the ring member 4.

The stator 7 comprises an annular core 9 having a saw-toothed inner periphery, and a stator winding 10 formed by providing coils respectively on all teeth 9a of the core 9. The stator 7 is fixed to the right end of the outer ring 3 by a press fit, with the inner ends of the core teeth 9a facing radially inward, whereby the inner periphery of the core 9 of the stator 7 is made concentric with the inner periphery of the outer ring 3. The core 9 has an inside diameter slightly larger than the outside diameter of the ring member 4.

The rotor 8 of the resolver 2 is provided by machining the portion of the ring member 4 facing the stator 7, i.e., a right end portion of the ring member 4, for use as a rotor. The rotor 8 is in the form of a cylindrical face having a center axis positioned slightly below the axis of the ring member 4. Thus, the rotor 8 is in the form of a cylindrical face which is eccentric with respect to the other outer peripheral surface 4a of the ring member 4. Accordingly, when the ring member 4 rotates, the gap between the stator core 9 having an inner periphery concentric with the inner periphery of the outer ring 3 and the rotor 8 comprising the eccentric cylindrical face alters, producing a voltage in accordance with the angle of rotation on the stator 7. The voltage is sent to a processing circuit through a signal line 11, whereby the state of rotation of the rotating shaft can be detected as required, for example, for ABS.

Figure 4:
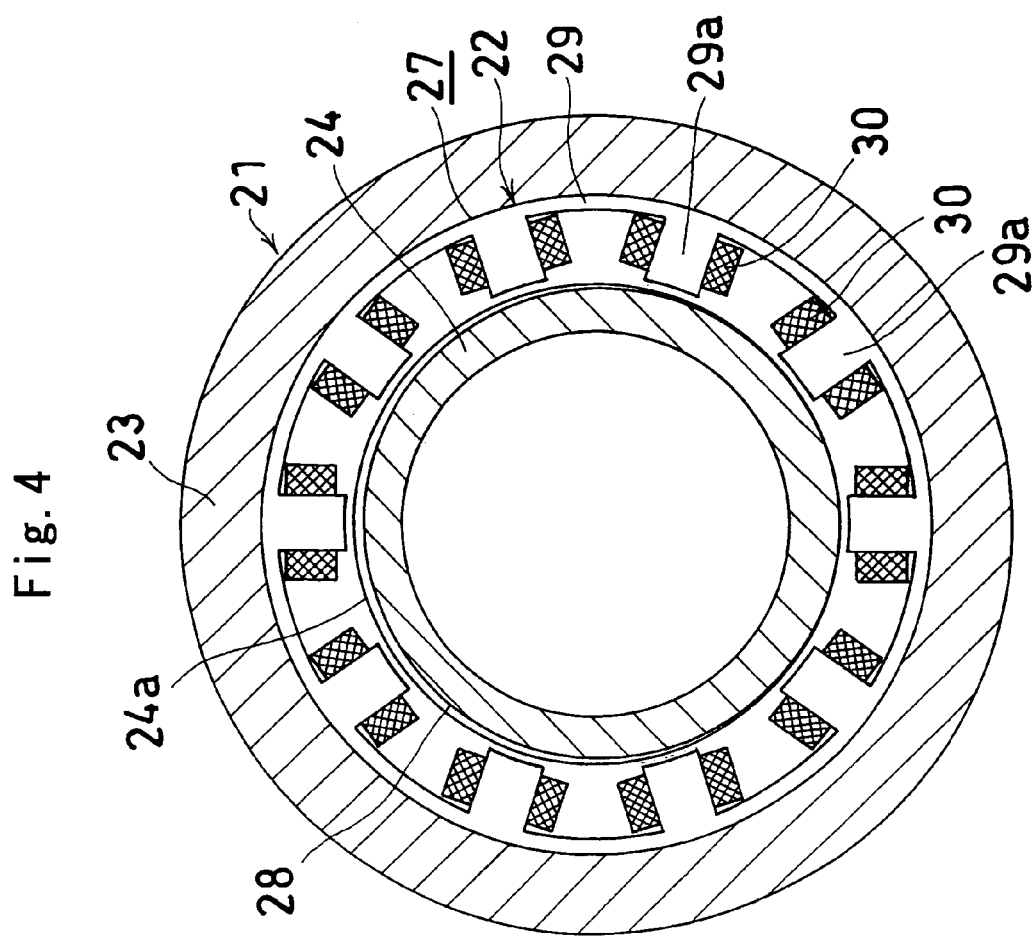
FIG. 4 is a view in section taken along the line IV-IV in FIG. 3.

FIGS. 3 and 4 show a second embodiment of sensor-equipped antifriction bearing unit of the invention. In the following description, the terms "left," "right," "upper" and "lower" refer respectively to the left- and right-hand sides and upper and lower sides of FIG. 3.

As shown in FIGS. 3 and 4, the sensor-equipped bearing unit comprises an antifriction bearing 21 serving as a bearing, and a resolver 22 for detecting the rotation thereof.

The antifriction bearing 21 is a double-row angular ball bearing and comprises an outer ring member 23 serving as a stationary ring, two inner ring members 24 serving as rotatable rings, balls 25 serving as rolling bodies arranged in two rows between these members 23, 24, and retainers 26 for holding the balls 25 in the respective rows. Although not shown, the outer ring member 23 is fixed to a housing or the like, and the inner ring members 24 have a rotating shaft or the like fixed thereto.

The resolver 22 is a VR-type brushless resolver, and comprises a stator 27 and a rotator 28. The stator 27 is provided on the outer ring member 23, and the rotor 28 on the inner ring member 24.

The stator 27 comprises an annular core 29 having a saw-toothed inner periphery, and a stator winding 30 formed by providing coils respectively on all teeth 29a of the core 29. The stator 27 is fixed approximately to the axial midportion of the outer ring member 23 by a press fit, with the inner ends of the core teeth 29a facing radially inward, whereby the inner periphery of the core 29 of the stator 27 is made concentric with the inner periphery of the outer ring member 23. The core 29 has an inside diameter slightly larger than the outside diameter of the inner ring members 24.

The rotor 28 of the resolver 22 is provided by machining the portion of the inner ring member 24 facing the stator 27 for use as a rotor. The stator 27 is positioned as slightly shifted rightward from the axial midpoint of the outer ring member 23 so that the core 29 thereof is opposed to the left end portion of the inner ring member 24 at the right. The right end portion only of the right inner ring member 24 is machined for use the rotor. The rotor 28 is in the form of a cylindrical face having a center axis positioned slightly below the axis of the inner ring member 24. Thus, the rotor 28 is in the form of an eccentric cylindrical face having an axis out of alignment with the axis of the other outer peripheral surface 24a of the inner ring member 24. Accordingly, when the inner ring members 24 rotate, the gap between the stator core 29 having an inner periphery concentric with the inner periphery of the outer ring member 23 and the rotor 28 comprising the eccentric cylindrical face alters, producing a voltage in accordance with the angle of rotation on the stator 27. The voltage is sent to a processing circuit through a signal line 31, whereby the state of rotation of the rotating shaft can be detected as required, for example, for ABS.

With the first and second embodiments described above, the outer ring 3 or 23 is the stationary side, and the ring member 4 or 24 is the rotatable side, whereas the outer ring 3 or 23 may serve as the rotatable side, and the ring member 4 or 24 as the stationary side. In this case, it is preferable to provide the rotor on the inner periphery of the outer ring 3 or 23, and the stator on the outer periphery of the ring member 4 or 24.

Figure 5:
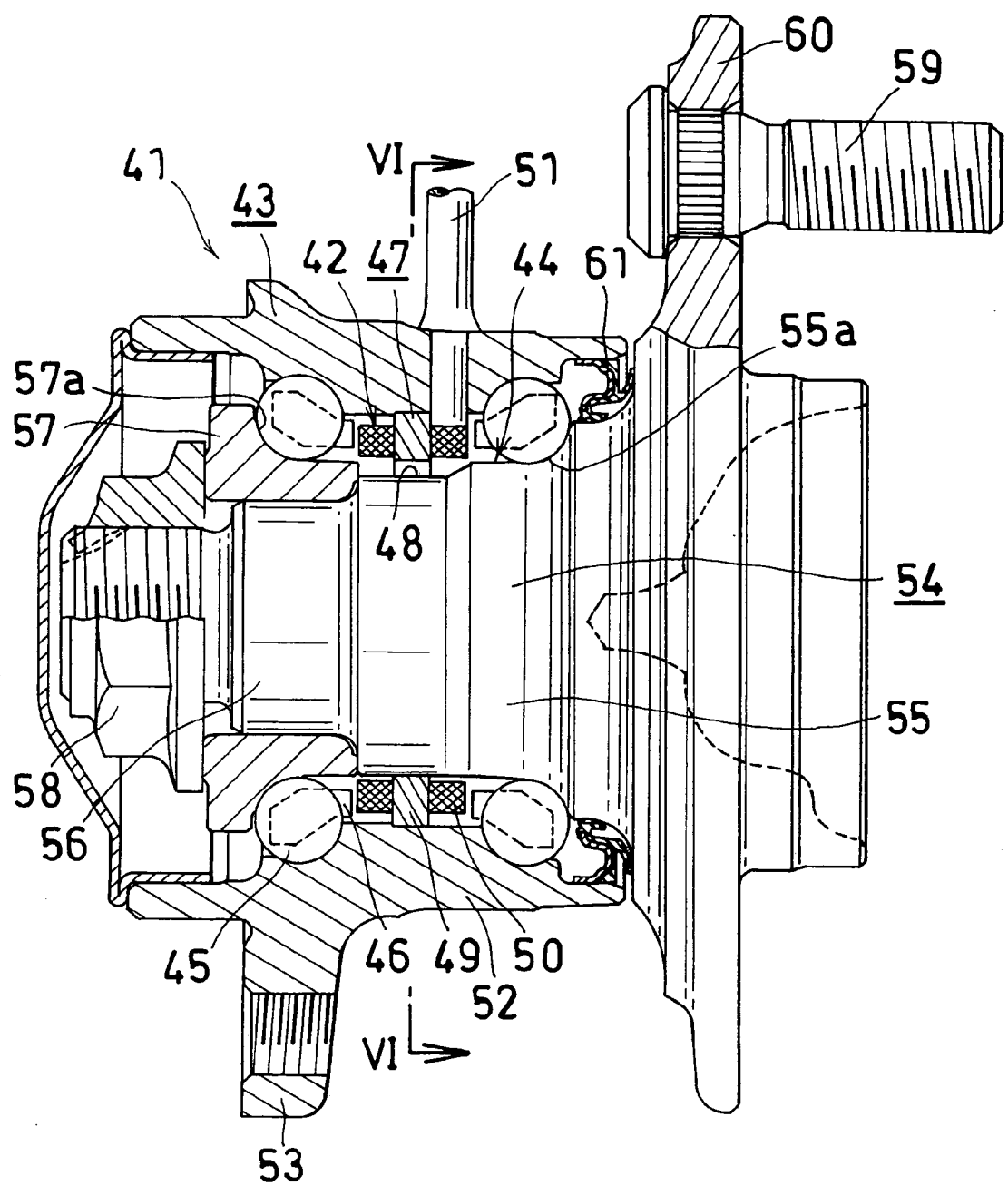
FIG. 5 is a view in cross section showing a third embodiment of sensor-equipped antifriction bearing unit according to the invention.
Figure 6:
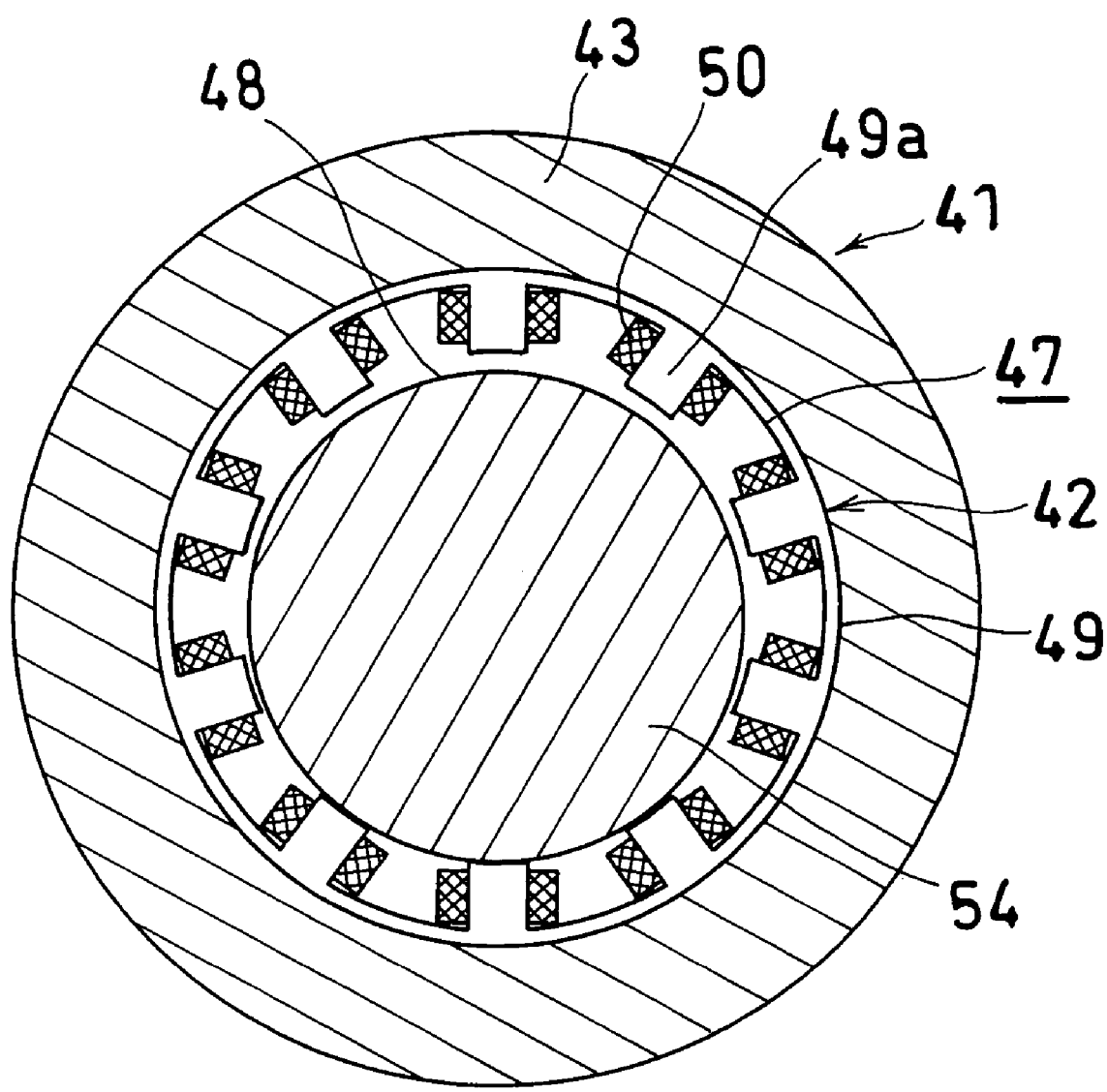
FIG. 6 is a view in section taken along the line VI-VI in FIG. 5.

FIGS. 5 and 6 show a third embodiment of sensor-equipped antifriction bearing unit of the invention. In the following description, the terms "left," "right," "upper" and "lower" refer respectively to the left- and right-hand sides and upper and lower sides of FIG. 5.

As shown in FIGS. 5 and 6, the sensor-equipped antifriction bearing unit comprises a hub unit 41 serving as a bearing, and a resolver 42 for detecting the rotation thereof.

The hub unit 41 comprises an outer ring member 43 serving as a stationary-side raceway member fixed to a vehicle body (hereinafter referred to as the "body-side raceway member"), an inner ring member 44 serving as a rotation-side raceway member to which a wheel is to be attached (hereinafter referred to as the "rotation-side raceway member"), balls 45 serving as rolling bodies arranged in two rows between the two members 43, 44, and retainers 46 for holding the balls 45 in the respective rows.

The body-side raceway member 43 has a hollow cylindrical portion 52 provided with two outer ring raceways on the inner periphery thereof, and a flange portion 53 provided in the vicinity of the left end of the cylindrical portion 52 and to be fastened with bolts to a suspension device (vehicle body). The rotation-side raceway member 44 comprises a shaft 54 composed of a large-diameter portion 55 having a first raceway 55*a*, and a small-diameter portion 56 having an outside diameter smaller than the diameter of the first raceway 55*a*; and a ring 57 fixedly fitted around the small-diameter portion 56 of the shaft 54. The shaft 54 has an externally threaded left end portion. A nut 58 is screwed on the externally threaded portion for holding the ring 57 in intimate contact with the left end face of the large-diameter portion 55 of the shaft 54. The shaft 54 has a flange 60 positioned close to the right end thereof and fixedly provided with bolts 59 for attaching the wheel. The ring 57 has a raceway 57*a* in parallel to the raceway 55*a* of the shaft 55. A seal device 61 is provided between the right end of the body-side raceway member 43 and the shaft 55.

The resolver 42 is a VR-type brushless resolver, and comprises a stator 47 and a rotator 48. The stator 47 is provided on the body-side raceway member 43, and the rotor 48 on the rotation-side raceway member 44.

The stator 47 comprises an annular core 49 having a saw-toothed inner periphery, and a stator winding 50 formed by providing coils respectively on all teeth 49*a* of the core 49. The stator 47 is fixed approximately to the axial midportion of the body-side raceway member 43 by a press fit, with the inner ends of the core teeth 49*a* facing radially inward, whereby the inner periphery of the core 49 of the stator 47 is made concentric with the inner periphery of the body-side raceway member 43. The core 49 has an inside diameter slightly larger than the outside diameter of the large-diameter portion 55 of the shaft 54.

The rotor 48 of the resolver 42 is provided by machining the portion of the rotation-side raceway member 44 facing the stator 47 for use as a rotor. The stator 47 is positioned as opposed to a portion of the shaft 54 close to the left end of the large-diameter portion 55 thereof. The left end part of large-diameter portion 55 of the shaft 54 is machined for use the rotor. The rotor 48 is in the form of a cylindrical face having a center axis positioned slightly below the axis of the rotation-side raceway member 44. Thus, the rotor is in the form of a cylindrical face which is eccentric with respect to the other outer peripheral surface of large-diameter portion of the shaft 54. Accordingly, when the rotation-side raceway member 44 rotates, the gap between the stator core 49 having an inner periphery concentric with the inner periphery of the body-side raceway member 43 and the rotor 48 comprising the eccentric cylindrical face alters, producing a voltage in accordance with the angle of rotation on the stator 47. The voltage is sent to a processing circuit through a signal line 31, whereby the state of rotation of the rotating shaft can be detected as required, for example, for ABS.

With the sensor-equipped antifriction bearing unit according to the third embodiment, the rotation-side raceway member 44 comprises a shaft 54 and a ring 57 integral therewith, so that when the unit is used as a bearing for the motor vehicle wheel, the bearing portion can be compacted and made lightweight.

Figure 7:
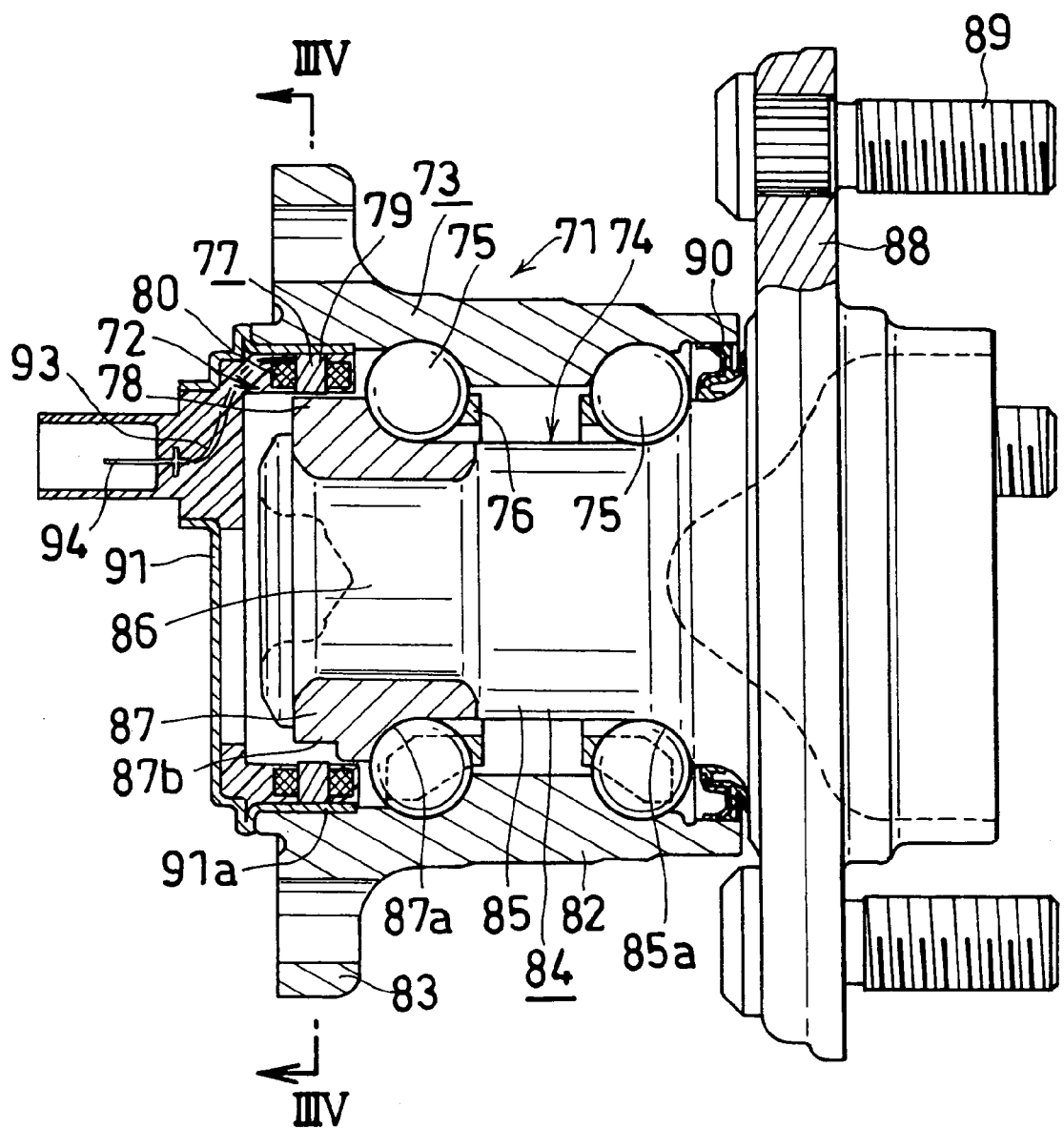
FIG. 7 is a view in cross section showing a fourth embodiment of sensor-equipped antifriction bearing unit according to the invention.
Figure 8:
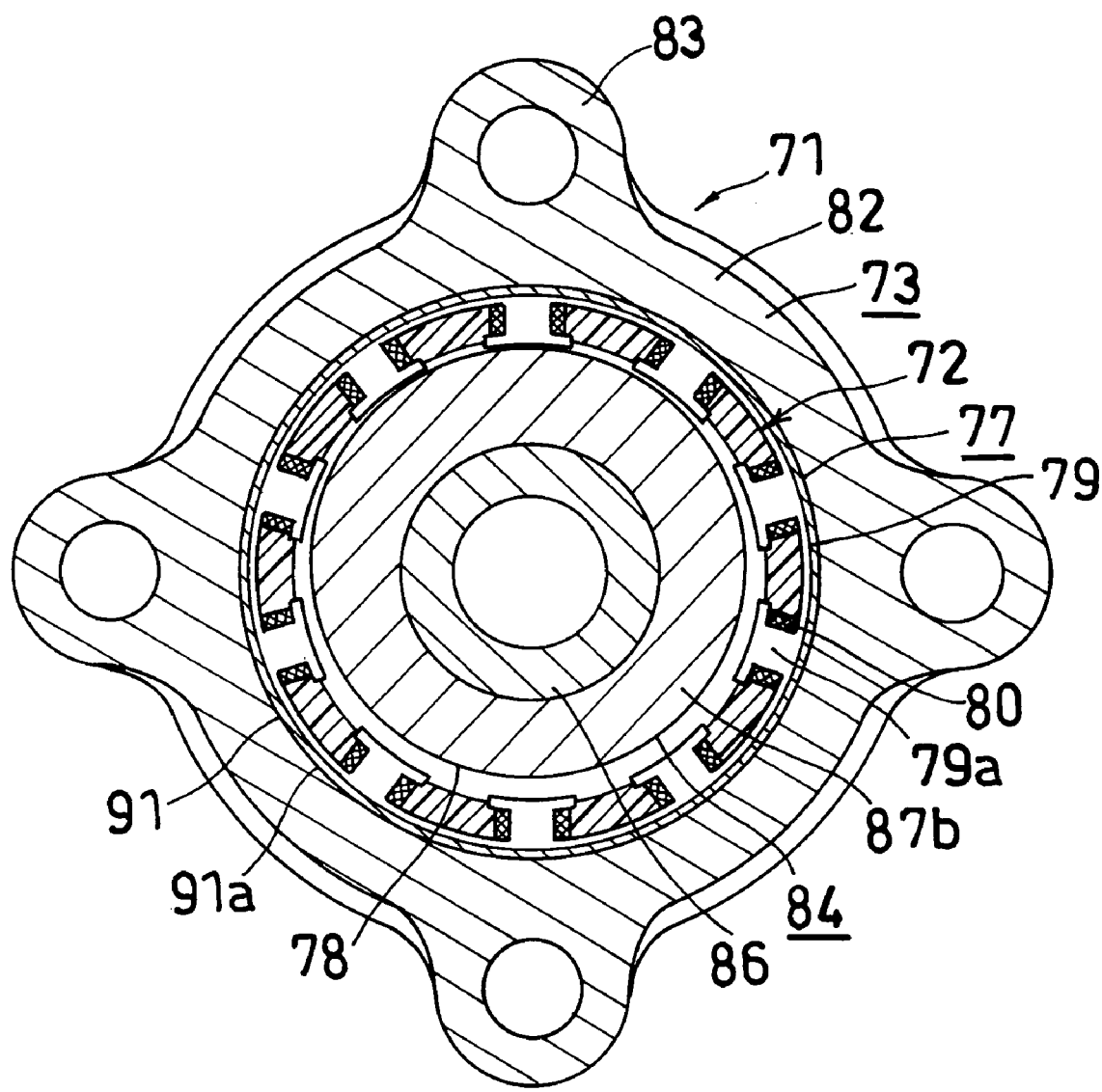
FIG. 8 is a view in section taken along the line VIII-VIII in FIG. 7.

FIGS. 7 and 8 show a fourth embodiment of sensor-equipped antifriction bearing unit of the invention.

As shown in FIGS. 7 and 8, the sensor-equipped antifriction bearing unit comprises a hub unit 71 serving as a bearing, and a resolver 72 serving as a sensor device for detecting the rotation thereof and ground contact load.

The hub unit 71 comprises a stationary-side raceway member 73 fixed to a vehicle body, a rotation-side raceway member 74 to which a wheel is to be attached, balls 75 serving as rolling bodies arranged in two rows between the two members 73, 74, and retainers 76 for holding the balls 75 in the respective rows.

The stationary-side raceway member 73 has a hollow cylindrical portion 82 provided with two outer ring raceways on the inner periphery thereof, and a flange portion 83 provided in the vicinity of the left end of the cylindrical portion 82 and to be fastened with bolts to a suspension device (vehicle body).

The rotation-side raceway member 74 comprises a shaft 84 composed of a large-diameter portion 85 having a first raceway 85*a*, and a small-diameter portion 86 having an outside diameter smaller than the diameter of the first raceway 85*a*; and a ring 87 fixedly fitted around the small-diameter portion 86 of the shaft 84 and having a right face in intimate contact with the left face of large-diameter portion 85 of the shaft 84. The shaft 84 has a flange 88 positioned close to the right end thereof and fixedly provided with bolts 89 for attaching the wheel. The ring 87 has at its right portion a raceway 87*a* in parallel to the raceway 85*a* of the shaft 84. The ring 87 has a shoulder portion 87*b* at its left portion. A seal device 90 is provided between the right end of the stationary-side raceway member 73 and the shaft 84. A cover 91 is fixedly provided over the left end portion of the stationary-side raceway member 73. The cover 91 is in the form of a bottomed hollow cylinder made of metal or resin and provided at the right end thereof with a hollow cylindrical fixed portion 91*a* fixedly fitting to the inner periphery of the left end portion of the stationary raceway member 73.

The resolver 72 is a VR-type brushless resolver and comprises a stator 77 and a rotor 78. The stator 77 is provided on the fixed portion 91*a* of the cover 91 and positioned as opposed to the ring shoulder portion 87*b*. The rotor 78 is positioned as opposed to the stator 77, i.e., on the shoulder portion 87*b* of ring 87 of the rotation-side raceway member 74. The stator 77 delivers a signal to the outside via a wiring member including a lead wire 93 and a connector pin 94.

As shown in detail in FIG. 8, the stator 77 comprises an annular core 79 having a saw-toothed inner periphery, and a stator winding 80 formed by providing coils respectively on all teeth 79*a* of the core 79. The stator 77 is fixed to the inner periphery of fixed portion 91*a* of the cover 91 by a press fit, with the inner ends of the core teeth 79*a* facing radially inward.

As shown on an enlarged scale, the fixed portion 91*a* of the cover 91 fixedly fitted to the inner periphery 73*a* of the left end portion of the stationary-side raceway member 73 is provided on the left side thereof with an annular ridge 91b projecting radially outward and in bearing contact with an axially outer end face of the left end portion of the member 73. The bottom of the cover 91 is provided with a connector member 91c to which signal transmitting-receiving harness is to be attached. The output of the stator winding 80 is delivered to the connector pin 94 through the lead wire 93. The lead wire 93, connector pin 94 and stator 77 are fixedly embedded in a resin 92 filling the interior of the cover 91. The core 79 of the stator 77 is left exposed from the resin only at the portion thereof opposed to the rotor 78. The connector member 91c at the bottom of the cover 91 is also made of resin, and the connector pin 94 is provided inside the connector member 91 and has an outer end projecting from the resin 92. A plurality of lead wires 93, as well as of connector pins 94, are provided for use with different signals. Thus, the stator 77 and wiring members 93, 94 therefor are provided only on the cover 91, so that the stator 71 and wiring therefore can be arranged and connected without the likelihood of wires breaking.

Figure 9:
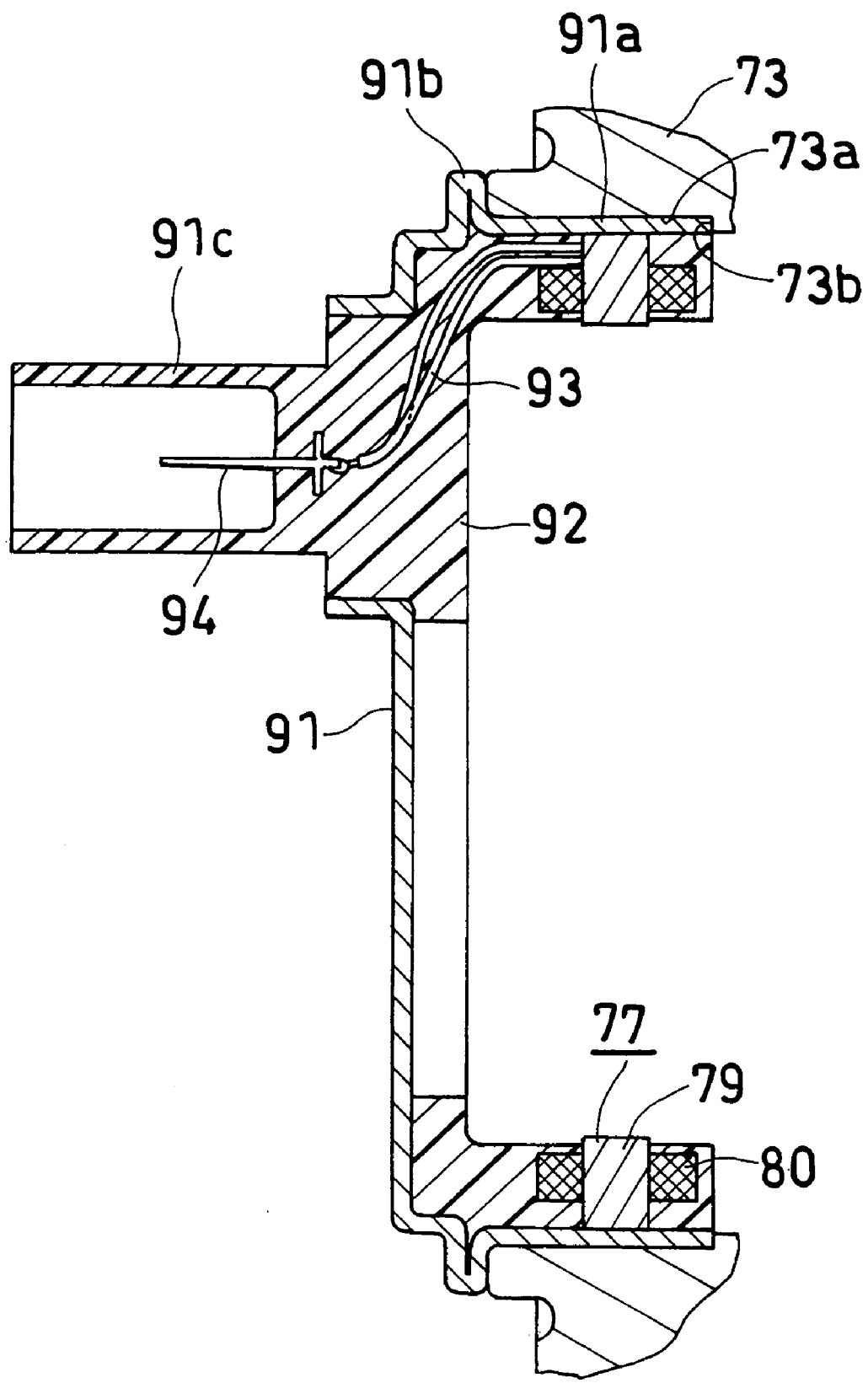
FIG. 9 is an enlarged view of FIG. 8 showing the portion having a resolver attached thereto in detail.

As shown in FIG. 9, the stationary-side raceway member 73 has close to its left end portion a stopper portion 73b having a diameter slightly smaller than the diameter of the left-end opening of the member 73. The right end of fixed portion 91a of the cover 91 comes into contact with this stopper portion 73b when the cover is placed in from the left rightward, whereby the stator 77 is precisely positioned in place as opposed to the ring 87. The stator 77 is forced into the left end portion of the stationary-side raceway member 73 by the cover 77 in this way, whereby the inner periphery of the stator core 79 is made concentric with the inner periphery of the raceway member 73. The inside diameter of the core 79 is slightly larger than the outside diameter of the shoulder portion 87b of the ring 87.

The face of the rotor 78 of the resolver 72 to be detected is provided by machining the portion of the ring 87 opposed to the stator, i.e., the outer periphery of the shoulder portion 87b, for use as a rotor. As seen in FIGS. 7 and 8, the face of the rotor 78 to be detected is in the form of a cylindrical face having a center axis which is positioned slightly above the axis of the hub unit 71, i.e., the center axis of the stator 77. Thus, the rotor face to be detected is in the form of a cylindrical face which is eccentric with respect to the inner peripheral surface of the stator 77. Accordingly, when the rotation-side raceway member 74 rotates, the gap between the stator core 79 and the face (eccentric cylindrical face) to be detected of the rotor 78 alters, producing a voltage in accordance with the angle of rotation on the stator 77. Thus variations in the voltage of the stator 77 are sent to a processing circuit through a signal line (not shown), whereby the state of rotation of the rotating shaft can be detected as required, for example, for ABS.

Figure 10:
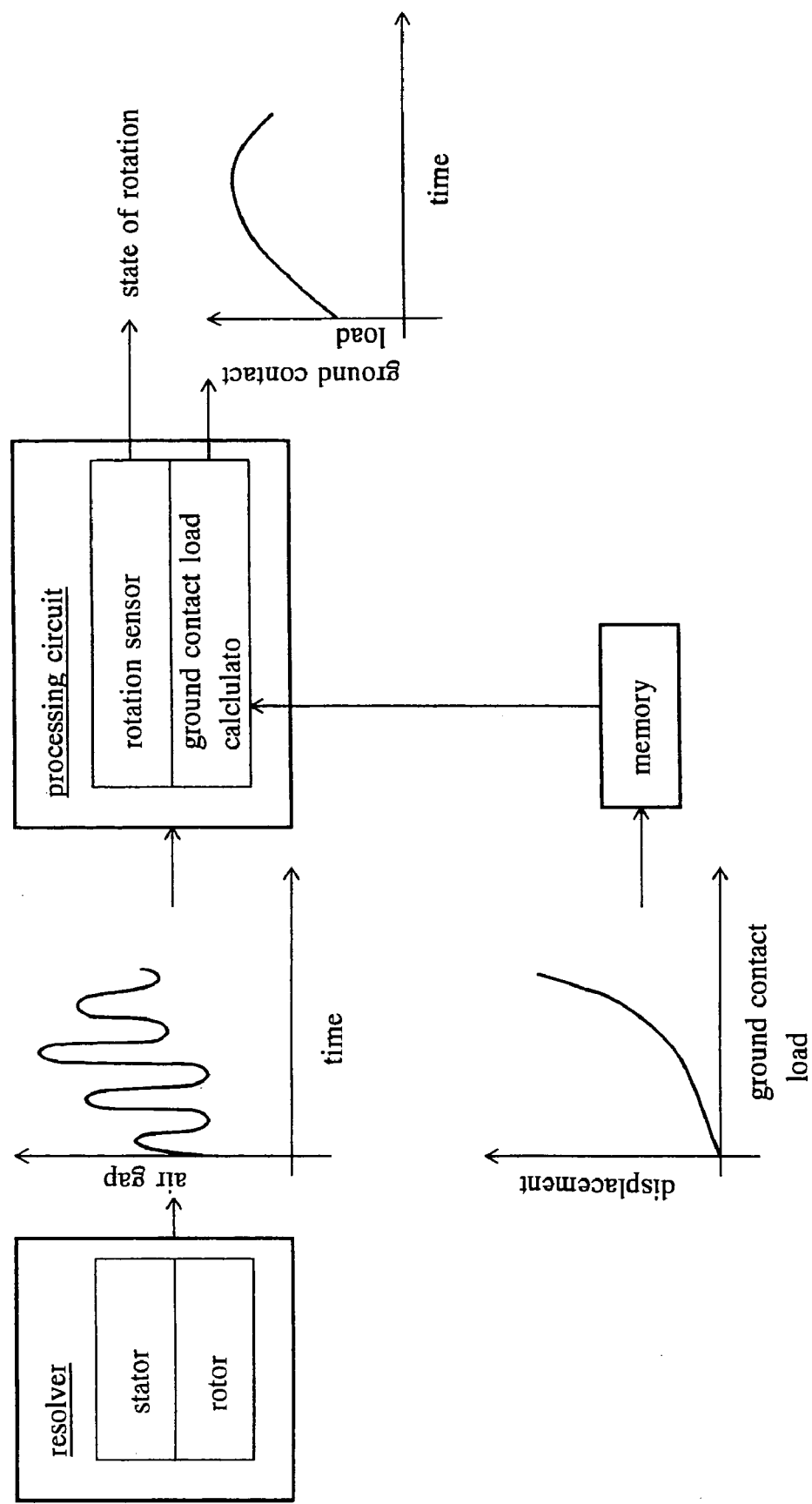
FIG. 10 is a block diagram showing a processing circuit of the sensor-equipped antifriction bearing according to the fourth embodiment.

With the sensor-equipped antifriction bearing units of the third and fourth embodiments, variations in the ground contact load on the tire varies the displacement of the rotation-side raceway member 44 or 74 relative to the stationary-side raceway member 43, 73, consequently varying the air gap between the stator 47 or 77 and the rotor 48 or 78 to be detected by the resolver 42 or 72. As shown in FIG. 10, variations in the air gap are output from the resolver 42, 72 as variations in voltage. Data, such as angle of rotation or rotational speed, required, for example, for ABS is determined based on the output signal by the rotation sensor of the processing circuit for the resolver (sensor device). The processing circuit for the resolver further has a ground contact load calculator having calculation equations stored therein for calculating the ground contact load from the displacement output as a voltage variation. The calculator calculates the ground contact load, which is fed to vehicle control means to control the vehicle properly.

Figure 11:
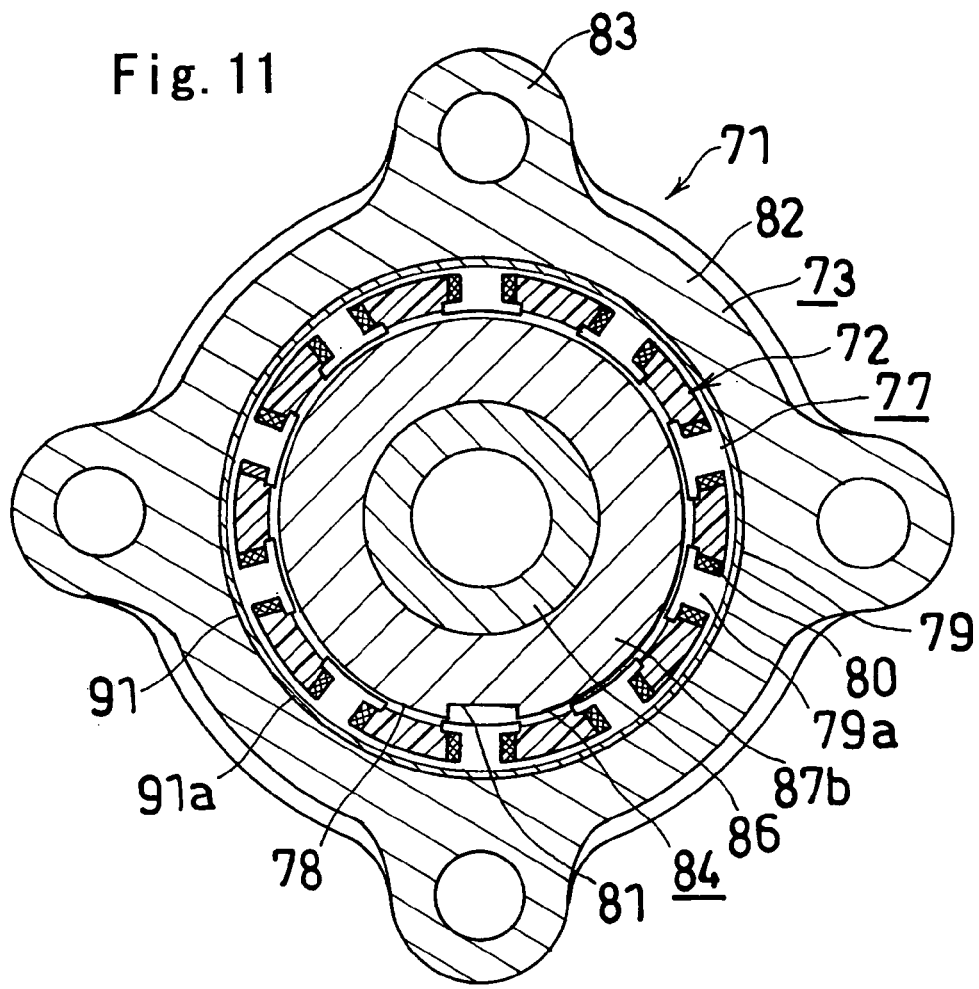
FIG. 11 is a sectional view showing a fourth embodiment of sensor-equipped antifriction bearing unit according to the invention and corresponding to FIG. 8 showing the fourth embodiment.

FIG. 11 shows a fifth embodiment of sensor-equipped antifriction bearing unit according to the invention. This embodiment differs from the fourth embodiment only with respect to the shape of the rotor 78. The difference only will be described below, and throughout the drawings concerned, like parts are referred to by like reference numerals and will not be described repeatedly.

The rotor 78 of this embodiment has exactly the same shape as the one shown in FIG. 7 in vertical section. As will be apparent from FIG. 11 corresponding to FIG. 8, a cutout 81 is formed in a cylindrical face concentric with the axis of the hub unit 71, i.e., the center axis of the stator 77, in place of an eccentric cylindrical face to provide the face of the rotor 78 to be detected.

Figure 12:
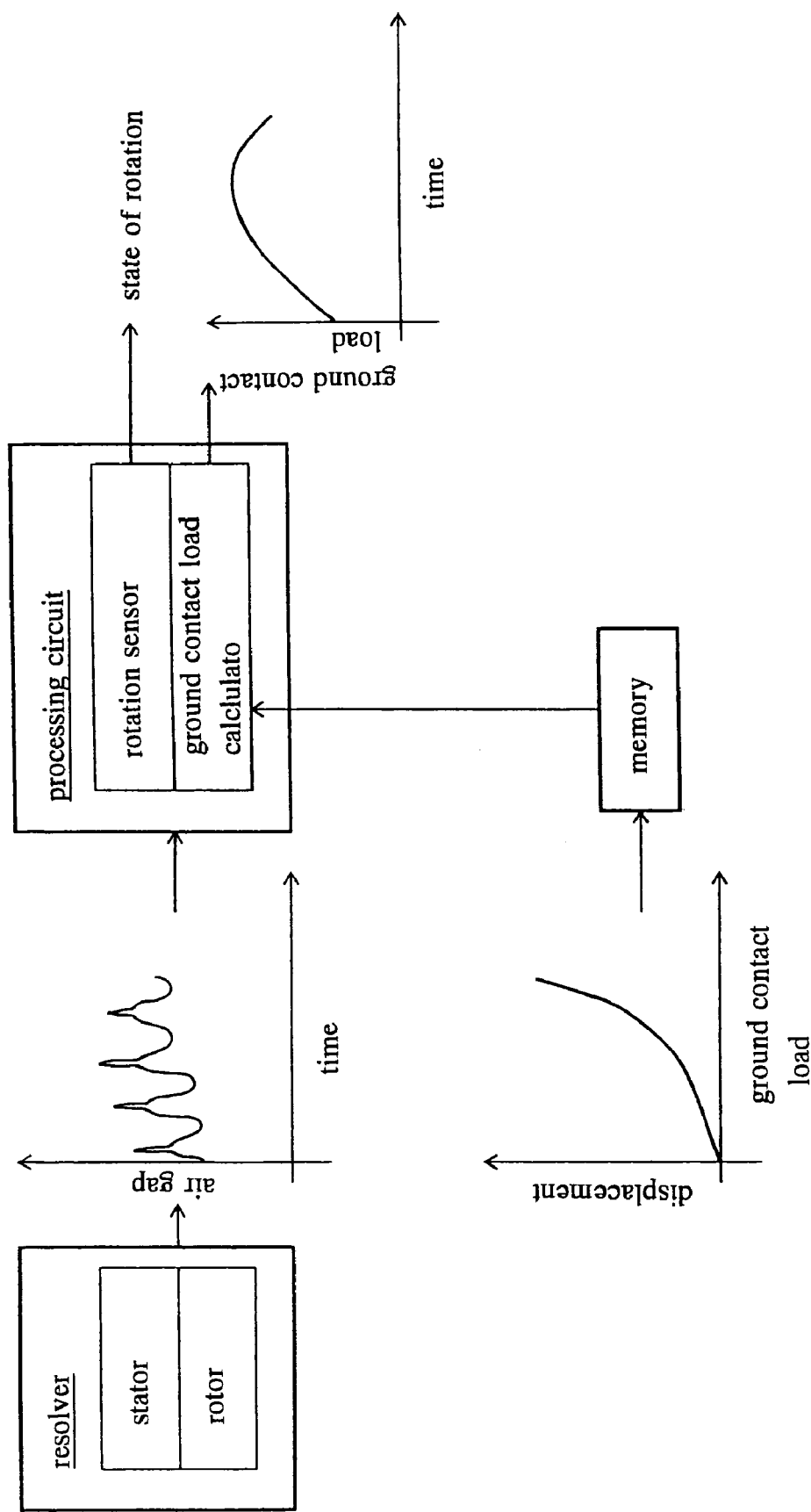
FIG. 12 is a block diagram showing a processing circuit of the sensor-equipped antifriction bearing according to the fifth embodiment.

With the sensor-equipped antifriction bearing unit according to the fifth embodiment, the displacement of the rotation-side raceway member 74 varies relative to the stationary-side member 73 when the ground contact load on the tire varies, consequently varying the air gap between the stator 77 and the rotor 78 to be detected by the resolver 72. As shown in FIG. 12, variations in the air gap are output from the resolver 72 as voltage variations. The air gap in the fourth embodiment gently varies with a relatively great amplitude since the face of the rotor 78 to be detected is in the form of an eccentric cylindrical face, whereas variations in the air gap in the fifth embodiment are in the form of a waveform of relatively small amplitude and pulselike peak values as superposed on the waveform since the face of the rotor 78 to be detected is in the form of a cylindrical face having a cutout 81. Based on the pulselike peak values of the output signal, the angle or rotation or rotational angle is determined as required, for example, for ABS by the rotation sensor of the processing circuit of the resolver (sensor device). The resolver processing circuit further has a ground contact load calculator having stored therein calculating equations for calculating the ground contact load from the waveform included in the variations and other than the pulselike peak values. The ground contact load is obtained by the calculator, and the load obtained is fed to vehicle control means for properly controlling the vehicle.

Figure 13:
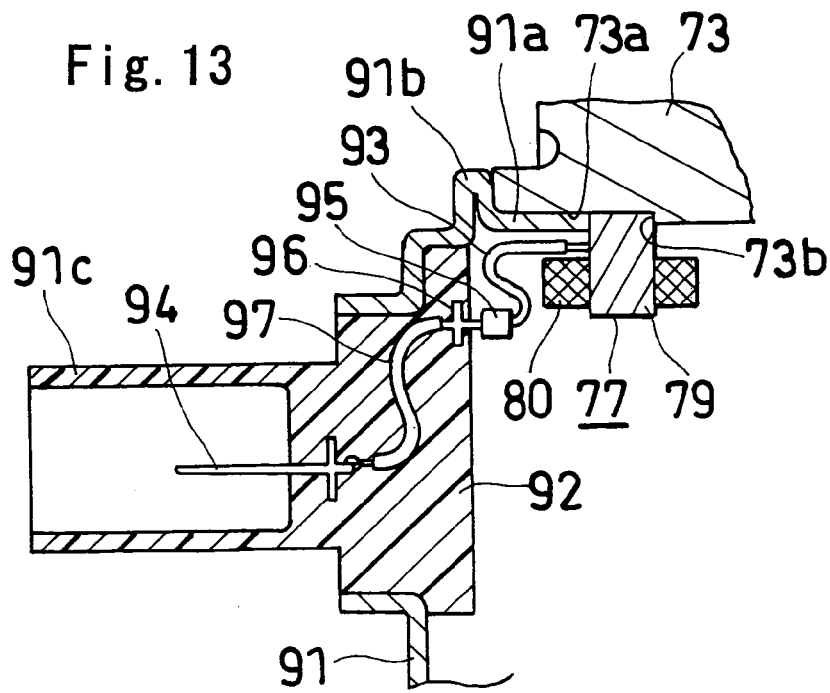
FIG. 13 is a view corresponding to FIG. 9 showing another embodiment of portion having a resolver attached thereto.

According to the embodiments shown in FIGS. 7 and 9, the stator 77 is installed in place by fixing the stator 77 to the cover 91 by a press fit, and fixing the cover 91 to the stationary-side raceway member 73 to fix the stator 77 thereto. However, the stator 77 may be fixed directly to the inner periphery 73a of the left end portion of the stationary-side raceway member 73 by a press fit as shown in FIG. 13. The stator 77 can be installed in this way by forcing the stator 77 into contact with the stopper portion 73b of the member 73, and thereafter fixedly fitting the cover 91 to the inner periphery 73a of the left end portion of the raceway member 73.

With this embodiment, a connector 95 is attached to the outer end of the lead wire 93 from the stator winding 80. A connector member 91C at the bottom of the cover 91 is made from resin like the one shown in FIG. 6, and a connector pin 94 is disposed inside the connector member 91c with its outer end projecting from the resin 92. Connected to the connector pin (end connector) 94 by a lead wire 97 is an intermediate connector pin 96. These pins 94, 96 and the lead wire 97 are fixedly embedded in the resin 92 filling the interior of the cover 91, with the outer ends of the pins 94, 96 left exposed. The lead wire 93 and the connector 95 closer to the stator winding 80 are separated from the resin 92. The wiring of this embodiment is connectable by fixing the stator 77 to the stationary-side raceway member 73 by a press fit and thereafter joining the connector 95 closer to the stator 77 to the intermediate connector pin 96 closer to the cover 91. The cover 91 having the connector pins 94, 96 and the lead wire 97 embedded inside thereof is then fixed to the raceway member 73 by a press fit. In this way, the wiring for the stator 77 can be completed easily without the likelihood of breaking.

INDUSTRIAL APPLICABILITY

When various antifriction bearings as of hub units of motor vehicles are replaced by the sensor-equipped antifriction bearing unit of the invention, sensor devices for detecting various data as to the motor vehicle can be provided in the form of antifriction bearing units, whereby useful data is available for controlling the vehicle to achieve improvements in the control of the motor vehicle.

The invention claimed is:

1. A sensor-equipped antifriction bearing unit comprising an antifriction bearing having an outer ring member and an inner ring member, and a resolver for detecting an air gap between the outer ring member and the inner ring member, one of the outer ring member and the inner ring member being provided with a stator of the resolver, the other ring member being provided at a position opposed to the stator with a face to be detected and formed directly for use as a rotor of the resolver, so that the rotor is integrally formed to the other ring member.

2. A sensor-equipped antifriction bearing unit according to claim 1 wherein the face of the rotor to be detected is in the form of a cylindrical face of the rotor which is eccentric with respect to the cylindrical surface which is concentric with a periphery of the other ring member.

3. A sensor-equipped antifriction bearing unit according to claim 1 wherein the face of the rotor to be detected is in the form of a cylindrical face centered about an axis of the antifriction bearing and having a cutout in a form of a flat portion formed in a circumferencial portion thereof.

4. A sensor-equipped antifriction bearing unit according to claim 1 wherein the antifriction bearing is a double-row bearing, and the stator is disposed at an intermediate portion between two rows of rolling bodies.

5. A sensor-equipped antifriction bearing unit according to claim 1 wherein the resolver is a VR-type resolver.

6. A sensor-equipped antifriction bearing unit according to claim 1 wherein the inner ring member is a rotation-side raceway member having a flange for attaching a wheel thereto and to be provided with the wheel, and the outer ring member is a stationary-side raceway member having a portion to be attached to a vehicle body side and mountable on a vehicle body.

7. A sensor-equipped antifriction bearing unit according to claim 6 wherein the rotation-side raceway member comprises a shaft composed of a large-diameter portion having a first raceway and a small-diameter portion having an outside diameter smaller than the diameter of the first raceway, and a ring having a second raceway and fitted around the small-diameter portion of the shaft.

8. A sensor-equipped antifriction bearing unit according to claim 7 wherein the stator is disposed at an end portion of the stationary-side raceway member opposed to a shoulder portion of the ring of the rotation-side raceway member, and the face of the rotor to be detected is formed directly on an outer periphery of the shoulder portion of the ring.

9. A sensor-equipped antifriction bearing unit according to claim 8 wherein wiring for the stator extends to the outside through an opening in the end portion of the stationary-side raceway member in the form of a hollow cylinder, and a hollow cylindrical cover having a bottom is provided over the end portion opening of the stationary-side raceway member, the cover having at the bottom thereof a connector member to be provided with a signal transmission harness.

10. A sensor-equipped antifriction bearing unit according to claim 9 wherein the stator is fixed to the cover, and the cover is fixed to the stationary-side raceway member.

11. A sensor-equipped antifriction bearing unit according to claim 9 wherein a wiring member including a lead wire and a connector pin is fixedly embedded in a resin filling interior thereof.

12. A sensor-equipped antifriction bearing unit according to claim 1 wherein the stator of the resolver comprises an annular core having a saw-toothed inner periphery, and a stator winding formed by providing coils respectively on all teeth of the core, and wherein the stator is fixed to the outer ring member by a press fit, with the inner ends of the core teeth facing radially inward.

\* \* \* \* \*